United States Patent
Hiraoka et al.

(10) Patent No.: US 6,436,179 B1
(45) Date of Patent: Aug. 20, 2002

(54) INK-JET RECORDING INK, INK COLOR SET, AND INK-JET RECORDING METHOD

(75) Inventors: Eisuke Hiraoka; Yoshiro Yamashita; Akihiko Chujo; Hiromi Nagai; Kaoru Watanabe; Yasuharu Endo; Ken Hashimoto, all of Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/516,021

(22) Filed: Feb. 29, 2000

(30) Foreign Application Priority Data

Mar. 9, 1999 (JP) .................................. 11-062168

(51) Int. Cl.[7] .................................................. C09D 11/02
(52) U.S. Cl. ............................. 106/31.58; 106/31.86; 106/31.43; 106/31.75
(58) Field of Search .................... 106/31.58, 31.86, 106/31.43, 31.75; 347/100

(56) References Cited

U.S. PATENT DOCUMENTS

| | | | | |
|---|---|---|---|---|
| 5,851,273 A | * | 12/1998 | Morris et al. | 106/31.27 |
| 5,851,274 A | * | 12/1998 | Lin | 106/31.43 |
| 5,948,154 A | * | 9/1999 | Hayashi et al. | 106/31.48 |
| 5,958,121 A | * | 9/1999 | Lin | 106/31.43 |
| 5,969,005 A | * | 10/1999 | Yamashita et al. | 523/161 |
| 5,980,623 A | * | 11/1999 | Hiraoka et al. | 106/31.49 |
| 5,993,524 A | * | 11/1999 | Nagai et al. | 106/31.27 |
| 6,015,455 A | * | 1/2000 | Yano et al. | 106/31.58 |
| 6,187,086 B1 | * | 2/2001 | Rehman | 106/31.86 |

FOREIGN PATENT DOCUMENTS

| | | |
|---|---|---|
| JP | B2 61-57878 | 12/1986 |
| JP | A 6-100790 | 4/1994 |
| JP | A 7-166084 | 6/1995 |
| JP | A 9-3380 | 1/1997 |
| JP | A 9-255887 | 9/1997 |

* cited by examiner

Primary Examiner—Helene Klemanski
Assistant Examiner—Veronica F. Faison
(74) Attorney, Agent, or Firm—Oliff & Berridge, PLC (57) ABSTRACT

Provided is magenta ink that satisfies all the necessary properties including good light-fastness, good color reproducibility, especially good color reproducibility of magenta-related secondary colors of red and blue, and high reliability, and gives satisfactory high-quality images. Also provided are a color ink set for ink-jet recording, which contains the magenta ink, and an ink-jet recording method in which is used the magenta ink or the color ink set. The magenta ink contains water, a colorant and at least two water-soluble organic solvents, and its visible-light absorbance spectrum gives a first peak A (abs.) within a range of from 500 to 570 nm and a second peak B (abs.) within a range of from 300 to 350 nm with a ratio A/B falling between 0.9 and 2.5. The magenta ink is combined with cyan ink and yellow ink to form the color ink set, which contains water, colorants and at least two water-soluble organic solvents.

10 Claims, 3 Drawing Sheets

INK-JET RECORDING INK, INK COLOR SET, AND INK-JET RECORDING METHOD

BACKGROUND OF THE INVENTION

1. Field of the Invention:

The present invention relates to an ink-jet recording ink having good light-fastness, good color reproducibility and high reliability and capable of giving high-quality images, to an ink-jet recording color ink set including the ink, and to an ink-jet recording method using the ink set.

2. Description of the Related Art:

The principle of ink-jet recording systems is that liquid or melted solid ink is jetted out through nozzles, slits, porous films or the like onto recording media such as paper, cloth, film and the like to thereby record images and others on the media. For jetting out ink, various systems have been proposed, including, for example, a charge control system where ink is jetted out by electrostatic induction force; a drop-on-demand system (pressure pulse system) where ink is jetted out by the oscillation pressure of piezoelectric devices; a thermal ink-jetting system where ink is jetted out by the pressure of bubbles formed and grown under heat at high temperatures, etc. In these systems, formed are extremely fine images.

Various types of ink are known usable in these ink-jet recording systems, including, for example, aqueous dye ink to be prepared by dissolving a water-soluble dye in a liquid medium that contains water and a water-soluble organic solvent; aqueous pigment ink to be prepared by dispersing a pigment in a liquid medium that contains water and a water-soluble organic solvent; oily dye ink to be prepared by dissolving an oil-soluble dye in an organic solvent, etc.

Of those types of ink, aqueous ink that contains a water-soluble dye dissolved in water is the mainstream of ink-jet recording ink. This is because it is safe as the essential solvent for it is water, and, in addition, it gives good and high-quality color images as it contains a dye, and further, it has good storage stability.

On the other hand, the recent demand in the art of ink-jet printing is for forming high-quality print images nearer to photographic images. For forming color images, it is important that magenta ink, cyan ink and yellow ink all have good color reproducibility by themselves, additionally having good color reproducibility to give secondary colors, red (R), green (G) and blue (B) when they are printed in layers. In order to obtain high-quality print images nearer to photographic images, plural inks having different color density levels are printed in layers. In consideration of this, it is also important that the plural inks do neither bleed nor mix together when printed plural times in layers, and, in addition, the printed inks could dry as soon as possible without delay. On the other hand, the resolution of print images is desired to increase in a high-resolution, small-drop ink-jet recording method. For this, the diameter of the nozzle of the ink-jet recording head to be used in the method is reduced, and it is important to prevent the nozzle from being clogged. In order to stably store print images for a long period of time without deteriorating their quality, it is important that the printing ink to be used for forming them has good fastness including waterproofness, light-fastness, etc. However, of four color inks of magenta, cyan, yellow and black for forming full-color images, magenta ink is readily deteriorated by light, and, as a result, the quality of images containing it is often much deteriorated.

To improve the light-fastness of such aqueous magenta dye ink, various studies and developments have been made. For example, in Japanese Patent Publication No. S61-57878, proposed is a method of adding a dye having a specific structure to ink to thereby improve the light-fastness of the ink. The ink containing such a specific dye could have good light-fastness, but is still problematic in that the images formed of it often bleed and it often clogs nozzles of small-drop heads.

In Japanese Patent Laid-Open Nos. H06-100790, H07-166084 and H09-255887, proposed are novel dyes having a specific absorbance profile. These dyes have good color reproducibility, but are also problematic in that their light-fastness is poor. In particular, when they are used in color ink sets for forming color images, expression of magenta-containing secondary colors of read and blue is poor.

On the other hand, for overcoming the problem with the color printing technology as above, proposed is a method of using C.I. Direct Red 227 as the colorant for magenta ink to thereby improve the color reproducibility of the ink, as in Japanese Patent Laid-Open No. H09-3380. In this method, however, the light-fastness of the magenta ink used is not good, and the storage stability of the color print images produced is not satisfactory.

As mentioned above, at present, no one could obtain satisfactory ink-jet recording ink, especially water-soluble ink for ink-jet recording which satisfies all the necessary properties including good light-fastness, good color reproducibility, especially good color reproducibility of magenta-related secondary colors of red and blue, and high reliability, and which gives satisfactory high-quality images.

SUMMARY OF THE INVENTION

Solving the problems in the related art as above, the present invention provides excellent magenta ink for ink-jet recording. Specifically, the magenta ink of the invention satisfies all the necessary properties including good light-fastness, good color reproducibility, especially good color reproducibility of magenta-related secondary colors of red and blue, and high reliability, and gives satisfactory high-quality images. The invention also provides a color ink set for ink-jet recording, which contains the magenta ink; and an ink-jet recording method in which is used the magenta ink or the color ink set.

Having assiduously studied, the present inventors have found that magenta ink, which comprising a water, a colorant and at least two water-soluble organic solvents, and of which the visible-light absorbance spectrum gives a first peak A (abs.) within a range of from 500 to 570 nm and a second peak B (abs.) within a range of from 300 to 350 nm with a ratio A/B falling between 0.9 and 2.5, is favorable to ink-jet recording, as having good light-fastness, good color reproducibility and good printing frequency responsibility and capable of forming excellent high-quality images without clogging nozzles. On the basis of this finding, we have completed the present invention.

Specifically, the invention provides:

Magenta ink for ink-jet recording, which comprisig a water, a colorant and at least two water-soluble organic solvents and of which the visible-light absorbance spectrum gives a first peak A (abs.) within the range of approximately from 500 to 570 nm and a second peak B (abs.) within a range of approximately from 300 to 350 nm with a ratio A/B falling approximately between 0.9 and 2.5;

The magenta ink for ink-jet recording, wherein the water-soluble organic solvents are at least two selected from polyalcohols, polyalkylene glycols, glycol ethers and polar solvents;

The magenta ink for ink-jet recording, wherein the content of the water-soluble organic solvents is approximately from 3 to 40% by weight of the ink;

The magenta ink for ink-jet recording, wherein the colorant is an anionic water-soluble dye and its content is approximately from 0.1 to 10.0% by weight of the ink;

The magenta ink for ink-jet recording, which contains (i) at least one surfactant selected from nonionic, anionic and ampholytic surfactants in an amount of approximately from 0.005 to 5% by weight of the ink, and (ii) a nitrogen-containing compound having a carboxylic acid and/or sulfonic acid structure, of which the pKa at 20° C. falls approximately between 6.0 and 10.0, and (iii) an alkali metal hydroxide;

The magenta ink for ink-jet recording, of which the pH falls approximately between 5.0 and 12.0, the surface tension, γ, falls approximately between 20 and 45 mN/m, and the viscosity, η, falls approximately between 1.5 and 5.0 mPas;

A color ink set of magenta ink, cyan ink and yellow ink for ink-jet recording, which contains water, colorants and at least two water-soluble organic solvents and contains the magenta ink mentioned above;

The color ink set for ink-jet recording, wherein the colorant for the cyan ink is at least one selected from C.I. Direct Blue 86, C.I. Direct Blue 199, C.I. Direct Blue 307 and C.I. Acid Blue 9, and the colorant for the yellow ink is at least one selected from C.I. Direct Yellow 86, C.I. Direct Yellow 132, C.I. Direct Yellow 142, C.I. Direct Yellow 144 and C.I. Direct Yellow 173;

The color ink set for ink-jet recording, wherein the cyan ink and the magenta ink both have at least two colorant density levels;

An ink-jet recording method, wherein the magenta ink or the color ink set as above is used and the amount of one ink drop to be jetted out through a nozzle falls approximately between 1 and 20 ng; and The ink-jet recording method, which is to print an image on an ink-jet recording sheet having at least approximately 40% of 75-degree mirror surface gloss as defined in JIS-Z-8741.

BRIEF DESCRIPTION OF THE DRAWINGS

Preferred embodiments of the invention will be described in detail based on the following figures, wherein.

DESCRIPTION OF THE PREFERRED EMBODIMENTS

The invention is described in detail hereinunder. Magenta Ink for Ink-Jet Recording:

The magenta ink for ink-jet recording of the invention is such that its visible-light absorbance spectrum gives a first peak A (abs.) within a range of from 500 to 570 nm and a second peak B (abs.) within a range of from 300 to 350 nm with a ratio A/B falling between 0.9 and 2.5, preferably between 1.6 and 1.9. If the ratio A/B is larger than 2.5, the ink could not sufficiently exhibit its UV-absorbing effect, and the light-fastness of the images printed with it will be poor. On the other hand, if A/B is smaller than 0.9, the light-fastness of the printed images will be also poor though the reason is not clear.

The details of the functional mechanism of the invention are not clear, but could be presumed as follows: The visible-light absorbance spectrum of magenta color gives a first peak within a range of from 500 nm to 570 nm. If the first peak appears at a site of wavelength shorter than 500 nm, the color will become reddish to orangish. On the other hand, if the first peak appears at a site of wavelength longer than 570 nm, the color will become violetish. Anyhow, magenta ink of which the first peak of the visible-light absorbance spectrum appears not within the defined range could not give pure magenta color. For these reasons, it is critical that the spectrum of the magenta ink of the invention gives a first peak falling within a range of from 500 nm to 570 nm for ensuring good magenta color reproducibility. The peak as referred to herein indicates the value actually measured, and could apply even to a composite absorption zone that includes plural absorption zones overlapping with each other.

Another characteristic of the magenta ink of the invention is that its absorbance profile gives a second peak (abs.) within a range of from 300 nm to 350 nm. As a rule, it is said that print images exposed to light will be deteriorated by visible rays and UV rays, as the colorant molecules are excited by those rays and the thus-excited molecules will react with each other. The magenta ink of the invention has an absorbance peak within a range of from 300 nm to 350 nm, which means that the ink absorbs the light falling within the near-UV range. In other words, the ink could act as a UV absorbent by itself. Therefore, it is presumed that, in the magenta ink of the invention, the excited colorant molecules could be restored to their ground state owing to the function of the ink acting as a UV absorbent by itself, and therefore the colorant molecules could be prevented from reacting with each other even when exposed to light.

The colorant to be in the magenta ink for ink-jet recording of the invention may be any of dyes and pigments, but preferred are dyes in view of their color reproducibility. Especially preferred are anionic water-soluble dyes in view of their safety and dissolution stability.

Anionic water-soluble dyes usable herein include, for example, acid dyes, direct dyes, reactive dyes, edible dyes, etc.

Preferably used herein are specific dyes for ink-jet recording, including, for example, Bayscript Magenta VP SP 25005 (from Bayer), JPD Magenta L-406 (from Nippon Kayaku), etc.

The dyes can be used either singly or as combined.

The dye content of the ink may vary, depending on the coloring capability of the dye, but preferably falls between 0.1 and 10.0% by weight of the ink. If the dye content is smaller than 0.1% by weight, the density of images formed will be low; but if larger than 10% by weight, excess dye will soon precipitate. From the viewpoint of the dissolution stability of the dye, the dye content is more preferably from 0.3 to 9% by weight.

When pigment is used as the colorant in the ink, the pigment content of the ink preferably falls between 1 and 10% by weight, more preferably between 2 and 8% by weight of the ink.

It is desirable that the water-soluble organic solvents to be in the magenta ink for ink-jet recording of the invention are at least two selected from polyalcohols, polyalkylene glycols, glycol ethers and polar solvents. The ink that contains at least two water-soluble organic solvents selected from polyalcohols, polyalkylene glycols, glycol ethers and polar solvents is preferred, as it could have good moisture retentiveness and, in addition, colorants are well soluble in the ink. Moreover, the ink containing them does not clog nozzles, and is stably jetted out therethrough. Further, even when the ink is stored for a long period of time, the colorant therein will neither deposit nor precipitate therein.

Of the solvents noted above, especially preferred are glycerin, diethylene glycol, 2,2'-thiodiethanol and sulforane, in view of the colorant dissolution stability in them. In view of the penetrability of the ink into paper and of the solubility of colorants in the solvents, also preferred are glycol ethers, and more preferred are diethylene glycol monoethyl ether, diethylene glycol monobutyl ether, and triethylene glycol monobutyl ether.

Preferred examples of polyalcohols and polyalkylene glycols for use herein are ethylene glycol, diethylene glycol, triethylene glycol, polyethylene glycol, propylene glycol, 1,5-pentanediol, glycerin, 2,2'-thiodiethanol, triethanolamine, etc.

Preferred examples of glycol ethers for use herein are ethylene glycol monomethyl ether, ethylene glycol monobutyl ether, diethylene glycol monoethyl ether, diethylene glycol monobutyl ether, triethylene glycol monobutyl ether, propylene glycol monomethyl ether, etc.

Polar solvents for use herein are those having a large dipolar moment or those having a high dielectric constant. Their preferred examples are N,N-dimethylformamide, 2-pyrrolidone, N-methyl-2-pyrrolidone, cyclohexylpyrrolidone, dimethylsulfoxide, sulforane, etc. Of those, especially preferred are cyclic compounds such as 2-pyrrolidone, N-methyl-2-pyrrolidone, cyclohexylpyrrolidone, sulforane, etc., in view of the colorant dissolution stability in them.

Apart from the solvents, any others, for example, alcohols such as ethanol, isopropanol, butanol, benzyl alcohol and the like, as well as alkanolamines such as monoethanolamine, diethanolamine, triethanolamine and the like may also be added to the magenta ink of the invention.

In the invention, it is desirable that the water-soluble organic solvent content of the ink falls between 3 and 40% by weight of the ink. If its solvent content is smaller than 3% by weight, the ink will soon dry to give deposits. If so, the ink will clog nozzles and could not be smoothly jetted out therethrough. On the other hand, if its solvent content is larger than 40% by weight, the ink will be poorly fixed on paper and, in addition, the viscosity of the ink will increase. If so, the ink could not also be smoothly jetted out through nozzles. From the balance of the fluidity of the ink not clogging nozzles and the stability thereof capable of being smoothly jetted out through nozzles, the solvent content of the ink is more preferably from 10.0 go 35.0% by weight.

Water for use in the magenta ink of the invention is preferably distilled water, ion-exchanged water, pure water or ultra-pure water. More preferred is ultra-pure water not contaminated with polyvalent cations, microorganisms and other contaminants, since the ink containing such ultra-pure water is stable while stored and does not clog nozzles.

Preferably, the pH value of the magenta ink of the invention falls between 5.0 and 12.0. Within that range, the ink could exhibit a favorable pH-buffering function. After having been printed and dried, the ink may not undergo rapid pH change, and therefore the printed images will not undergo color change. If, however, the pH of the ink is lower than 5.0, colorants could not stably dissolve in the ink and will soon deposit therein. On the other hand, if its pH is higher than 12.0, the ink will corrode, dissolve and even peel the wall and its coating layer of the head and other members in the ink-jet recording system where the ink is all the time kept in contact with the them, thereby often causing damage to the members. In consideration of the colorant dissolution stability in the ink and even the stability of other constituent ingredients of the ink, the pH value of the ink falls more preferably between 6.0 and 10.0, even more preferably between 6.5 and 9.0. The pH value of the ink is measured with a pH meter (from Horiba Seisakusho) at 20° C. and 50% RH.

Preferably, the magenta ink of the invention has a surface tension, $\gamma$, falling between 20 and 45 mN/m and a viscosity, $\eta$, falling between 1.5 and 5.0 mPas. In that condition falling within the defined range, the penetrability and the fixability of the magenta ink into and on paper could be favorably controlled, and, as a result, the printed ink does not bleed or mix with other printed ink of different color, and good printed images could be obtained. Another advantage of the magenta ink in that condition is that, even when it is continuously jetted out through nozzles of an ink-jet recording system for a long period of time, it can stably pass through the nozzles to give all the time good images not having patchy or white streaks in the solid area. If, however, its surface tension, $\gamma$ is smaller than 20 mN/m, the ink will too much penetrate in paper, and the density of the printed images will below. If so, in addition, the printed images will often bleed, and their solid area will have patchy or white streaks. On the other hand, if its surface tension is larger than 45 mN/m, the ink could not well penetrate into paper, and the printed images could not dry rapidly. If so, the printed images will mix with other ink additionally printed thereon, and their quality will become poor. If its viscosity, $\eta$ is smaller than 1.5 mPas, the ink could not be stably jetted out through nozzles; but if larger than 5.0 mPas, the ink could not rapidly penetrate into paper, and the printed images could not dry rapidly. If so, the printed images will mix with other ink additionally printed thereon, and their quality will become poor. In consideration of the quality of the printed images and the stability of the ink while jetted out through nozzles, it is more desirable that the surface tension, $\gamma$, of the ink falls between 30 and 39 mN/m and the viscosity, $\eta$, thereof falls between 1.5 and 2.5 mPas.

The surface tension, $\gamma$, as referred to herein indicates the surface tension of the formulated ink liquid as measured with a surface tensiometer (from Kyowa Surface Chemistry Co.) at 20° C. and 50% RH. The viscosity, $\eta$, also referred to herein indicates the viscosity of the formulated ink liquid as measured with a viscometer (from Rheomat) at 20° C. and 50% RH.

The ink for ink-jet recording of the invention may contain any other ingredients. The additional ingredients are not specifically defined, and may be suitably selected and added to the ink in accordance with their object.

For example, surfactant may be added to the ink. Surfactant, if added to the ink, will promote the penetrability of the ink into paper and will interact with the colorant molecules in the ink, thereby improving the wettability of the colorant with paper fibers. As a result, the ink could be uniformly and clearly printed on paper to give thereon high-quality images with good color tone.

The surfactant that may be added to the ink of the invention is at least one selected from nonionic surfactants, anionic surfactants and ampholytic surfactants.

The nonionic surfactants include, for example, polyoxyethylene alkyl phenyl ethers such as polyoxyethylene nonyl phenyl ether, polyoxyethylene octyl phenyl ether, polyoxyethylene dodecyl phenyl ether, etc.; and also polyoxyethylene alkyl ethers, polyoxyethylene fatty acid esters, sorbitan fatty acid esters, polyoxyethylene-polyoxypropylene block copolymers, acetylene glycol-ethylene oxide adducts, glycerin-ethylene oxide adducts, polyoxyethylene sorbitan fatty acid esters, fatty acid alkylolamides, etc.

The anionic surfactants include, for example, salts of alkylbenzenesulfonic acids, salts of alkylnaphthalenesulfonic acids, condensates of salts of alkylnaphthalenesulfonic acids with formalin, salts of higher fatty acids, sulfate salts of higher fatty acid esters, sulfonic acid salts of higher fatty acid esters, sulfate salts of higher alcohol ethers, sulfonic acid salts of higher alcohol ethers, as well as alkylcarboxylic acid salts, sulfosuccinic acid salts and their ester salts of higher alkylsulfonamides, etc.

The ampholytic surfactants include, for example, betaine, sulfobetaine, sulfatebetaine, imidazolidonebetaine, etc.

Of those surfactants, preferred are nonionic surfactants for use in the invention, as they hardly interact with ions of colorants and with ions of other ingredients. More preferred are polyoxyethylene alkyl ethers, polyoxyethylene alkyl phenyl ethers and polyoxyethylene-polyoxypropylene block copolymers, in view of their thermal stability and purity.

In the invention, the surfactant content of the magenta ink preferably falls between 0.005 and 5% by weight, more preferably between 0.01 and 2% by weight of the ink.

Also preferably, the magenta ink of the invention contains a nitrogen-containing compound having a carboxylic acid and/or sulfonic acid structure (the acid structures may be in the form of salts), of which the pKa at 20° C. falls between 6.0 and 10.0, and an alkali metal hydroxide (it is represented by MOH in which M is selected from Li, Na and K).

The nitrogen-containing compound usable in the invention, which has a carboxylic acid and/or sulfonic acid structure (the acid structures may be in the form of salts), and of which the pKa at 20° C. falls between 6.0 and 10.0, may be a nitrogen-containing compound having a carboxyl group-substituted alkyl group and/or a sulfonic acid group-substituted alkyl group. In addition to the carboxyl group and the sulfonic acid group, the compound may further have a hydroxyl group-substituted alkyl group and/or a carbamoyl group-substituted alkyl group, etc.

The carboxyl group-substituted alkyl group includes, for example, a carboxymethyl group, a 1-carboxyethyl group, a 2-carboxyethyl group, a 1-carboxy-n-propyl group, a 2-carboxy-n-propyl group, a 3-carboxypropyl group, a 2-carboxy-i-propyl group, a 1-carboxy-n-butyl group, a 4-carboxybutyl group, a 3-carboxy-i-butyl group, a 2-methyl-4-carboxybutyl group, a carboxy-t-butyl group, a 5-carboxypentyl group, etc.

The sulfonic acid group-substituted alkyl group includes, for example, the carboxyl group-substituted alkyl groups as above in which the carboxyl group is replaced with a sulfonic acid group.

In the alkyl group, the acidic group may be in the form of its lithium, sodium, potassium or ammonium salt. Preferred examples of the acidic group are a carboxymethyl group, a 1-carboxyethyl group, a 1-carboxy-n-propyl group, a sulfomethyl group, a 1-sulfoethyl group, and a 1-sulfo-n-propyl group.

The hydroxyl group-substituted alkyl group includes, for example, a methylol group, a 2-hydroxyethyl group, a methylolmethyl group, a trimethylolmethyl group, a 1-hydroxy-n-propyl group a 2-hydroxy-n-propyl group, a 3-hydroxypropyl group, a 2-hydroxy-i-propyl group, a 1-hydroxy-n-butyl group, a 4-hydroxybutyl group, a 3-hydroxy-i-butyl group, a 2-methyl-4-hydroxybutyl group, a hydroxy-t-butyl group, a 5-hydroxypentyl group, etc.

The carbamoyl group-substituted alkyl group includes, for example, the carboxyl group-substituted alkyl groups as above in which the carboxyl group is replaced with a carbamoyl group. Preferred examples of the group are a methylol group, a 2-hydroxyethyl group, a trimethylolmethyl group, a carbamoylmethyl group, etc.

The nitrogen-containing compound substituted with the groups includes, for example, acetamidoglycine, N-2-hydroxyethylglycine, N-carbamoylmethyl-β-alanine, N-2-hydroxyethyl-N-carbamoylmethylglycine, N-hydroxymethyl-N-carbamoylmethyl-γ-aminobutyric acid, N-caboxymethyliminodiacetamide, N-carbamoylmethyliminodiacetic acid, N-hydroxypropyliminodipropionic acid, N,N-bis(2-hydroxyethyl)glycine, etc.; as well as aminoethanesulfonic acid, N-2-hydroxyethyl-2-aminoethanesulfonic acid, N-3-hydroxypropyl-2-aminoethanesulfonic acid, N-carbamoylmethyl-2-aminoethanesulfonic acid, N,N-bis (2-hydroxyethyl)-2-aminoethanesulfonic acid, N-2-hydroxyethyl-N-carbamoylmethylaminoethanesulfonic acid, N-2-hydroxyethyl-N-carbamoylmethyl-2-aminoethanesulfonic acid, N,N-bis-carbamoylmethyl-2-aminoethanesulfonic acid, N-2-hydroxyethyliminodiethanesulfonic acid, N-tris (hydroxymethyl)methyl-3-aminopropanesulfonic acid, and their lithium, sodium, potassium or ammonium salts, etc.

Of those nitrogen-containing compounds, preferred for use in the invention are aminoethanesulfonic acid, N,N-bis (2-hydroxyethyl)-2-aminoethanesulfonic acid, acetamidoglycine, N-carbamoylmethyliminodiacetic acid, N-tris(hydroxymethyl)methyl-3-aminopropanesulfonic acid, and N,N-bis(2-hydroxyethyl)glycine, in view of their solubility in ink vehicles. In view of its thermal stability, more preferred is N,N-bis(2-hydroxyethyl)-2-aminoethanesulfonic acid.

The ink of the invention may contain one or more these nitrogen-containing compounds either singly or as combined.

The amount of the nitrogen-containing compound that may be in the magenta ink may vary, depending on the solubility of colorants in the ink and on the color stability of the colorants relative to the pH of the ink. In order that the nitrogen-containing compound could exhibit a satisfactory capability to stabilize the colorant dissolution in the ink and exhibit a satisfactory capability to stabilize the pH of the ink, and in order that the compound itself could sufficiently and stably dissolve in the ink, the amount of the compound in the ink preferably falls between 0.03 and 8% by weight of the ink. In consideration of the balance between the pH stability of the ink and the dissolution stability of the nitrogen-containing compound in the ink, the amount of the compound in the ink is more preferably from 0.05 to 3% by weight of the ink.

The alkali metal hydroxide that may be in the ink of the invention may be selected from lithium hydroxide, sodium hydroxide and potassium hydroxide. Of these, preferred are lithium hydroxide and sodium hydroxide, as they exhibit good water retentiveness when ionized.

In the invention, the amount of the alkali metal hydroxide that may be in the magenta ink shall vary, depending on the amount of the nitrogen-containing compound noted above, and therefore could not be determined unconditionally. In order that the magenta ink could have a preferred pH value falling between 6.0 and 12.0, the amount of the alkali metal hydroxide to be therein is preferably at least 0.03% by weight of the ink. However, in order to prevent the ink from causing damage to the ink-jet recording system where it is used, or that is, in order to sufficiently prevent the ink from corroding, dissolving and even peeling the wall and its coating layer of the head and other members in the ink-jet recording system where the ink is all the time kept in contact with the them, the amount of the alkali metal hydroxide to be in the ink is preferably at most 5.0% by weight. Concretely, within the range of from 0.03 to 5.0% by weight, the amount of the alkali metal hydroxide in the ink is preferably so controlled that the ink could have a preferred pH value falling between 6.0 and 12.0.

Apart from the ingredients noted above, the magenta ink of the invention may optionally contain any other additives, for example, an antifungal agent such as sodium dehydroacetate, sodium benzoate, etc.; an inclusion compound such as cyclodextrin, polycyclodextrin, macrocyclic amines, etc.; a solubilizer such as urea, thiourea, etc.; as well as a viscosity-controlling agent, an electroconductive agent, etc. Color Ink Set for Ink-Jet Recording:

The magenta ink of the invention may be combined with cyan ink and yellow ink to fabricate an ink set. The ink set of the invention has good color reproducibility and forms good color images.

The colorant for the cyan ink is not specifically defined, and may be any dye and pigment. However, in view of its color reproducibility, preferred is dye. More preferred is water-soluble dye, as being safe. Concretely, it is desirable that the cyan ink contains at least one selected from C.I. Direct Blue 86, C.I. Direct Blue 199, C.I. Direct Blue 307, and C.I. Acid Blue 9, in view of their light-fastness and color reproducibility. Of these dyes, especially preferred are C.I. Direct Blue 199 and C.I. Direct Blue 307, in consideration of the balance of their light-fastness and color reproducibility. These dyes may be used either singly or as combined. For color correction, any of acid dyes, direct dyes, reactive dyes and edible dyes described in the Color Index may be added to the cyan ink within the range not interfering with the color reproducibility and the light-fastness of the ink.

The colorant for the yellow ink may also be dye and pigment, but preferred is dye in view of its color reproducibility. More preferred is water-soluble dye, as being safe. Concretely, it is desirable that the yellow ink contains at least one selected from C.I. Direct Yellow 86, C.I. Direct Yellow 132, C.I. Direct Yellow 142, and C.I. Direct Yellow 144 and C.I. Direct Yellow 173, in view of their light-fastness. Of these dyes, especially preferred are C.I. Direct Yellow 132, C.I. Direct Yellow 142 and C.I. Direct Yellow 144 in view of the balance of their light-fastness and color reproducibility. These dyes may be used either singly or as combined. For color correction, any of acid dyes, direct dyes, reactive dyes and edible dyes described in the Color Index may be added to the yellow ink within the range not interfering with the color reproducibility and the light-fastness of the ink.

Optionally, the color ink set of the invention may contain black ink. The colorant for the black ink may be any dye and pigment, but preferred is dye, and more preferred is water-soluble dye. The black ink may be a mixture of cyan ink, magenta ink and yellow ink such as those mentioned above to give a composite color.

Each color ink to be in the color ink set of the invention may have at least two colorant density levels. The colorant density levels of the color inks may be suitably determined, depending on the type of the colorants used. Regarding the colorant density levels of plural inks all having the same color, it is desirable that the colorant density levels of lower-density inks fall between $2/3$ and $1/20$ of the colorant density level of the highest-density ink of being 1. Within that range, the graininess in the low-density area of the images formed of the inks will be favorably reduced. If, however, the lower-density inks used have a colorant density level higher than $2/3$, the dot density in the low-density area of the images formed will decrease, whereby the individual dots constituting the low-density area will be relatively too much striking and the graininess in that area will unfavorably increase. On the other hand, if the lower-density inks used have a colorant density level lower than $1/20$, they must be much overlaid one over another to obtain a desired image density. If so, the printing time will increase, and the time for drying the printed image will also increase. What is more, the printing medium such as paper could not well absorb the ink drops, and the non-absorbed ink drops will remain on the image as uneven spots. To reduce the graininess in the printed image and to prevent the printed image from having uneven spots, it is more desirable that the colorant density levels of the lower-density inks fall between $1/2$ and $1/10$ of the colorant density level of the highest-density ink.

Ink-Jet Recording Method:

The magenta ink and the color ink set containing it of the invention are favorable to small-drop ink-jet recording for high-resolution images, for which the amount of one ink drop to be jetted out through a nozzle preferably falls between 1 and 20 ng/pulse. As the case may be, they could be used even in a large-drop ink-jet recording method where large ink drops over 20 ng/pulse each are jetted out through a nozzle. However, in order to obtain better images having a higher degree of resolution, preferred is a small-drop ink-jet recording method for high-resolution images where the amount of one ink drop to be jetted out through a nozzle falls between 1and 20 ng/pulse. In the small-drop ink-jet recording method, preferably used are the magenta ink and the color ink set containing it of the invention to give high-quality images, and the ink and the ink set of the invention do not clog nozzles. For obtaining images of higher quality, it is desirable that the amount of one ink drop to be jetted out through a nozzle in the small-drop ink-jet recording method where the ink and the ink set of the invention are used falls between 1 and 10 ng/pulse and more preferably, 1 and 5 ng/pulse.

Also preferably, the magenta ink and the color ink set containing it of the invention is printed on an ink-jet recording sheet having a 75-degree mirror surface gloss as defined in JIS-Z-8741 of at least 40%. The magenta ink and the color ink set containing it of the invention, when printed on the ink-jet recording sheet of that type, gives thereon good color images, as their color reproducibility on the sheet is good. The sheet has at least one coating layer on its surface on which images are printed. The coating layer may contain at least one of inorganic or organic, fine-grain substances and pigments, and/or cationic substances.

The inorganic fine grains preferably have a large surface area and a low refractive index, including, for example, inorganic or organic pigments and grains, such as synthetic fine-grain silica, calcium carbonate, magnesium carbonate, kaolin, talc, calcium sulfate, barium sulfate, titanium oxide, zinc oxide, zinc carbonate, aluminium silicate, aluminium hydroxide, aluminium oxide, calcium silicate, magnesium silicate, polyaluminium hydroxide compounds, alumina hydrate, colloidal silica, cereal starch grains, processed starch grains, plastic pigments, urea resin pigments, crystalline cellulose grains, amorphous cellulose grains, etc. Of those pigments and grains, preferred are synthetic fine-grain silica, magnesium carbonate, barium sulfate, aluminium hydroxide, polyaluminium hydroxide compounds, alumina hydrate, cereal starch grains and processed starch grains, in view of their ink-absorbability and the color of printed images.

The cationic substances may be any known, monomeric, oligomeric or polymeric, cationic resins and cationic surfactants capable of being dissociated to be cationic when dissolved in water. The cationic resins include, for example, polyalkylene-amines and polyalkylene-polyamines such as polyethylene-amine, polypropylene-polyamine, etc., and their derivatives; as well as acrylic resins and diacrylamines having a tertiary amino group or a quaternary ammonium group, etc. The cationic surfactants include, for example, primary, secondary or tertiary amines, quaternary ammonium salts, etc.

EXAMPLES

The invention is described in more detail with reference to the following Examples, which, however, are not intended to restrict the scope of the invention.

Example 1

| | |
|---|---|
| Bayscript Magenta VP SP 25005 (from Bayer) | 2.5 parts by weight |
| Diethylene glycol | 5.0 parts by weight |
| Glycerin | 5.0 parts by weight |
| Sulforane | 10.0 parts by weight |
| Diethylene glycol monobutyl ether | 5.0 parts by weight |
| Surfactant (Surfinol 465, from Nisshin Chemical Co.) | 0.1 part by weight |
| Sodium hydroxide | 0.12 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 μm filter under pressure to prepare ink.

Example 2

| | |
|---|---|
| Bayscript Magenta VP SP 25005 (from Bayer) | 2.0 parts by weight |
| 2,2'-Thiodiglycol | 10.0 parts by weight |
| Sulforane | 5.0 parts by weight |
| Diethylene glycol monoethyl ether | 5.0 parts by weight |
| Urea | 5.0 parts by weight |
| Surfactant (Pluronic PE4300, from BASF) | 0.2 part by weight |
| Potassium hydroxide | 0.22 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 μm filter under pressure to prepare ink.

Example 3

| | |
|---|---|
| Bayscript Magenta VP SP 25005 (from Bayer) | 1.8 parts by weight |
| Ethylene glycol | 10.0 parts by weight |
| Propylene glycol | 5.0 parts by weight |
| N-methyl-2-pyrrolidone | 5.0 parts by weight |
| Diethylene glycol monobutyl ether | 5.0 parts by weight |
| Surfactant (polyoxyethylene lauryl ether (15 mols EO adduct), from Nippon Yushi) | 0.1 part by weight |
| Potassium hydroxide | 0.22 part by weight |
| N-(2-acetamido)iminodiacetic acid (pKa = 6.60) | 1.6 parts by weight |
| Ion-exchanged water | balance |

The above ingredients are well mixed and dissolved, and then filtered through a 0.45 μm filter under pressure to prepare ink.

Example 4

| | |
|---|---|
| Bayscript Magenta VP SP 25005 (from Bayer) | 1.2 parts by weight |
| Glycerin | 10.0 parts by weight |
| 2-Pyrrolidone | 10.0 parts by weight |
| Diethylene glycol monoethyl ether | 5.0 parts by weight |
| Urea | 5.0 parts by weight |
| Surfactant (Pluronic PE4300, from BASF) | 0.2 part by weight |
| Sodium hydroxide | 0.18 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 μm filter under pressure to prepare ink.

Example 5

| | |
|---|---|
| JPD Magenta L-406 (from Nippon Kayaku) | 2.6 parts by weight |
| Ethylene glycol | 10.0 parts by weight |
| Propylene glycol | 5.0 parts by weight |
| 2-Pyrrolidone | 5.0 parts by weight |
| Propylene glycol monobutyl ether | 5.0 parts by weight |
| Surfactant (Surfinol 465, from Nisshin Chemical) | 0.1 part by weight |
| Sodium hydroxide | 0.23 part by weight |
| N,N-bis(2-hydroxyethyl)-2-aminoethanesulfonic acid | 1.5 parts by weight |
| Ion-exchanged water | balance |

The above ingredients are well mixed and dissolved, and then filtered through a 0.45 μm filter under pressure to prepare ink.

Example 6

| | |
|---|---|
| JPD Magenta L-406 (from Nippon Kayaku) | 2.2 parts by weight |
| Diethylene glycol | 10.0 parts by weight |
| 2,2'-Thiodiglycol | 5.0 parts by weight |
| N-methyl-2-pyrrolidone | 5.0 parts by weight |
| Propylene glycol monobutyl ether | 5.0 parts by weight |
| Surfactant (Pluronic PE4300, from BASF) | 0.2 part by weight |
| Potassium hydroxide | 0.17 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 μm filter under pressure to prepare ink.

Example 7

| | |
|---|---|
| JPD Magenta L-406 (from Nippon Kayaku) | 2.0 parts by weight |
| Glycerin | 10.0 parts by weight |
| 2-Pyrrolidone | 5.0 parts by weight |
| N-methyl-2-pyrrolidone | 5.0 parts by weight |
| Diethylene glycol monobutyl ether | 5.0 parts by weight |
| Urea | 5.0 parts by weight |
| Surfactant (polyoxyethylene lauryl ether (15 mols EO adduct), from Nippon Yushi) | 0.1 part by weight |
| Sodium hydroxide | 0.18 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 μm filter under pressure to prepare ink.

Example 8

| | |
|---|---|
| JPD Magenta L-406 (from Nippon Kayaku) | 1.5 parts by weight |
| Ethylene glycol | 10.0 parts by weight |
| Propylene glycol | 10.0 parts by weight |
| Diethylene glycol monoethyl ether | 5.0 parts by weight |
| Surfactant (Surfinol 465, from Nisshin Chemical) | 0.1 part by weight |
| Potassium hydroxide | 0.11 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 μm filter under pressure to prepare ink.

Example 9

The following cyan ink and yellow ink were prepared, and combined with the magenta ink of Example 1 to produce a three-color ink set.

Cyan Ink:

| | |
|---|---|
| C.I. Direct Blue 199 | 3.5 parts by weight |
| Diethylene glycol | 5.0 parts by weight |
| Glycerin | 5.0 parts by weight |
| Sulforane | 10.0 parts by weight |
| Diethylene glycol monobutyl ether | 5.0 parts by weight |
| Surfactant (Surfinol 465, from Nisshin Chemical) | 0.1 part by weight |
| Sodium hydroxide | 0.12 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 μm filter under pressure to prepare ink.

Yellow Ink:

| | |
|---|---|
| C.I. Direct Yellow 144 | 2.0 parts by weight |
| Diethylene glycol | 5.0 parts by weight |
| Glycerin | 5.0 parts by weight |
| Sulforane | 10.0 parts by weight |
| Diethylene glycol monobutyl ether | 5.0 parts by weight |
| Surfactant (Surfinol 465, from Nisshin Chemical) | 0.1 part by weight |
| Sodium hydroxide | 0.12 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 μm filter under pressure to prepare ink.

Example 10

The following cyan ink and yellow ink were prepared, and combined with the magenta ink of Example 2 to produce a three-color ink set.

Cyan Ink:

| | |
|---|---|
| C.I. Direct Blue 307 | 3.5 parts by weight |
| 2,2'-Thiodiglycol | 10.0 parts by weight |
| Sulforane | 5.0 parts by weight |
| Diethylene glycol monoethyl ether | 5.0 parts by weight |
| Urea | 5.0 parts by weight |
| Surfactant (Pluronic PE4300, from BASF) | 0.2 part by weight |
| Potassium hydroxide | 0.22 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 μm filter under pressure to prepare ink.

Yellow Ink:

| | |
|---|---|
| C.I. Direct Yellow 132 | 2.0 parts by weight |
| 2,2'-Thiodiglycol | 10.0 parts by weight |
| Sulforane | 5.0 parts by weight |
| Diethylene glycol monoethyl ether | 5.0 parts by weight |
| Urea | 5.0 parts by weight |
| Surfactant (Pluronic PE4300, from BASF) | 0.2 part by weight |
| Potassium hydroxide | 0.22 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 μm filter under pressure to prepare ink.

Example 11

The following cyan ink and yellow ink were prepared, and combined with the magenta ink of Example 6 to produce a three-color ink set.

Cyan Ink:

| | |
|---|---|
| C.I. Direct Blue 86 | 3.5 parts by weight |
| Diethylene glycol | 10.0 parts by weight |
| 2,2'-Thiodiglycol | 5.0 parts by weight |
| N-methyl-2-pyrrolidone | 5.0 parts by weight |
| Propylene glycol monobutyl ether | 5.0 parts by weight |
| Surfactant (Pluronic PE4300, from BASF) | 0.2 part by weight |
| Potassium hydroxide | 0.17 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 μm filter under pressure to prepare ink.

Yellow Ink:

| | |
|---|---|
| C.I. Direct Yellow 86 | 2.0 parts by weight |
| Diethylene glycol | 10.0 parts by weight |
| 2,2'-Thiodiglycol | 5.0 parts by weight |
| N-methyl-2-pyrrolidone | 5.0 parts by weight |
| Propylene glycol monobutyl ether | 5.0 parts by weight |
| Surfactant (Pluronic PE4300, from BASF) | 0.2 part by weight |
| Potassium hydroxide | 0.17 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 µm filter under pressure to prepare ink.

Comparative Example 1

| | |
|---|---|
| C.I. Direct Red 227 | 2.0 parts by weight |
| Diethylene glycol | 20.0 parts by weight |
| Sulforane | 10.0 parts by weight |
| Diethylene glycol monobutyl ether | 5.0 parts by weight |
| Surfactant (Surfinol 465, from Nisshin Chemical) | 0.1 part by weight |
| Potassium hydroxide | 0.12 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 µm filter under pressure to prepare ink.

Comparative Example 2

| | |
|---|---|
| C.I. Acid Red 52 | 2.0 parts by weight |
| 2,2'-Thiodiethanol | 30.0 parts by weight |
| Surfactant (Pluronic PE4300, from BASF) | 0.2 part by weight |
| Potassium hydroxide | 0.22 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 µm filter under pressure to prepare ink.

Comparative Example 3

| | |
|---|---|
| C.I. Acid Red 289 | 2.0 parts by weight |
| Propylene glycol | 5.0 parts by weight |
| Sulforane | 5.0 parts by weight |
| Surfactant (polyoxyethylene lauryl ether (15 mols EO adduct), from Nippon Yushi) | 0.1 part by weight |
| Potassium hydroxide | 0.18 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 µm filter under pressure to prepare ink.

Comparative Example 4

| | |
|---|---|
| C.I. Reactive Red 24 | 2.0 parts by weight |
| Ethylene glycol | 15.0 parts by weight |
| Diethylene glycol | 15.0 parts by weight |
| N-methyl-2-pyrrolidone | 10.0 parts by weight |
| Diethylene glycol monoethyl ether | 5.0 parts by weight |
| Surfactant (Pluronic PE4300, from BASF) | 0.2 part by weight |
| Potassium hydroxide | 0.23 part by weight |
| N,N-bis(2-hydroxyethyl)-2-aminoethanesulfonic acid (pKa = 7.15) | 1.5 parts by weight |
| Ion-exchanged water | balance |

The above ingredients are well mixed and dissolved, and then filtered through a 0.45 µm filter under pressure to prepare ink.

Comparative Example 5

| | |
|---|---|
| C.I. Direct Red 227 | 2.5 parts by weight |
| Glycerin | 15.0 parts by weight |
| 2,2'-Thiodiethanol | 10.0 parts by weight |
| N-methyl-2-pyrrolidone | 10.0 parts by weight |
| Diethylene glycol monobutyl ether | 5.0 parts by weight |
| Urea | 5.0 parts by weight |
| Surfactant (polyoxyethylene lauryl ether (15 mols EO adduct), from Nippon Yushi) | 0.1 part by weight |
| Potassium hydroxide | 0.17 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 µm filter under pressure to prepare ink.

Comparative Example 6

| | |
|---|---|
| C.I. Acid Red 52 | 2.5 parts by weight |
| Propylene glycol | 5.0 parts by weight |
| 2-Pyrrolidone | 10.0 parts by weight |
| N-methyl-2-pyrrolidone | 10.0 parts by weight |
| Propylene glycol monobutyl ether | 5.0 parts by weight |
| Surfactant (Surfinol 465, from Nisshin Chemical) | 0.1 part by weight |
| Potassium hydroxide | 0.11 part by weight |
| N-(2-acetamido)iminodiacetic acid (pKa = 6.60) | 1.5 parts by weight |
| Ion-exchanged water | balance |

The above ingredients are well mixed and dissolved, and then filtered through a 0.45 µm filter under pressure to prepare ink.

Comparative Example 7

The magenta ink of Comparative Example 1 is combined with the cyan ink and the yellow ink of Example 9 to produce a three-color ink set.

Comparative Example 8

The magenta ink of Comparative Example 2 is combined with the cyan ink and the yellow ink of Example 10 to produce a three-color ink set.

Comparative Example 9

The magenta ink of Comparative Example 5 is combined with the cyan ink and the yellow ink of Example 11 to produce a three-color ink set.

Test Example 1

Measurement of Characteristics of Ink

The characteristics of the inks and the ink sets of Examples 1 to 11 and Comparative Examples 1 to 9 are measured under the conditions mentioned below. The data are given in Tables 1 and 3.

Figure 1A:
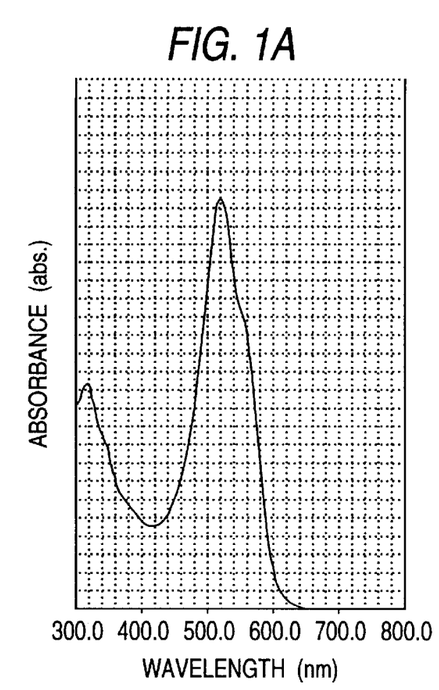
FIG. 1A, FIG. 1B and FIG. 1C are graphs of the visible-light absorbance spectra of magenta inks for ink-jet recording of Example 1, Example 2 and Example 3, respectively.
Figure 1B:
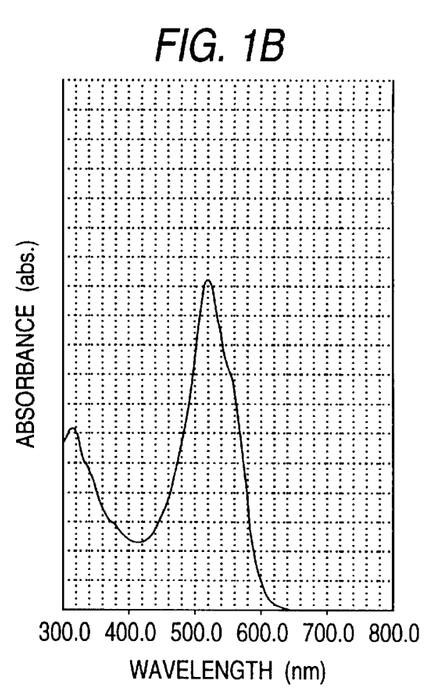
Figure 1C:
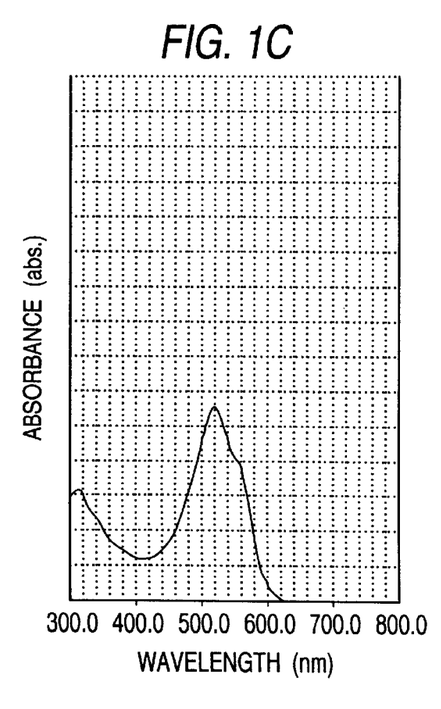
Figure 2A:
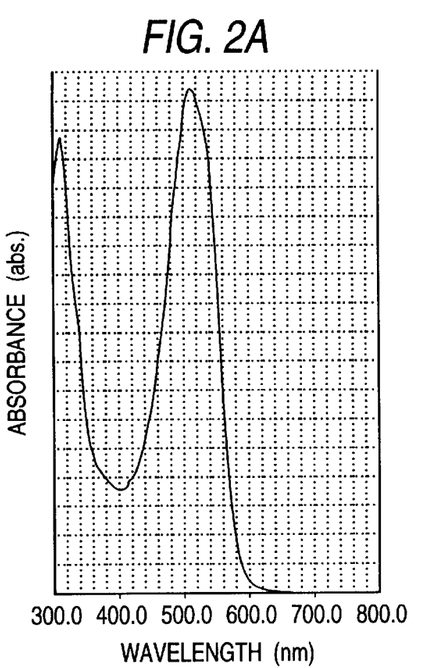
FIG. 2A, FIG. 2B and FIG. 2C are graphs of the visible-light absorbance spectra of magenta inks for ink-jet recording of Example 5, Example 6 and Example 7, respectively.
Figure 2B:
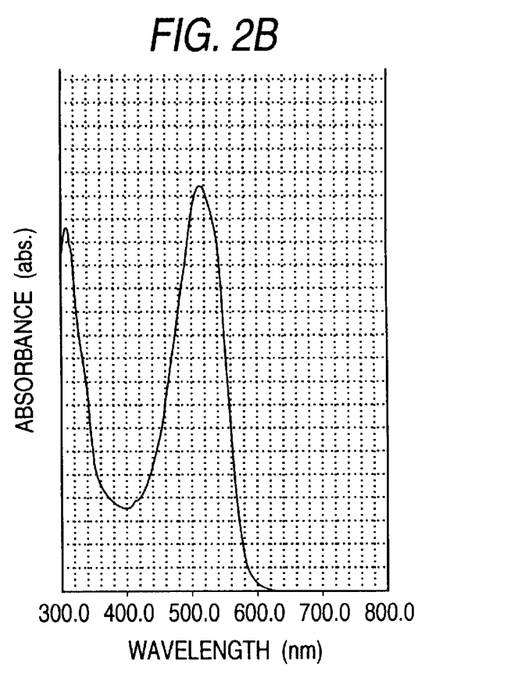
Figure 2C:
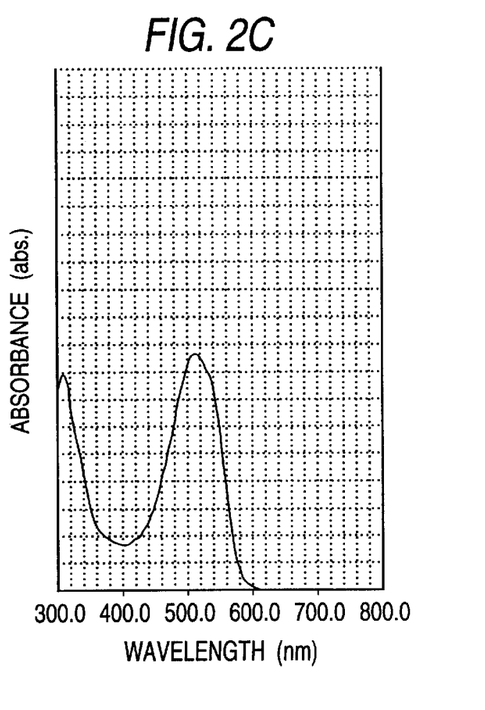
Figure 3A:
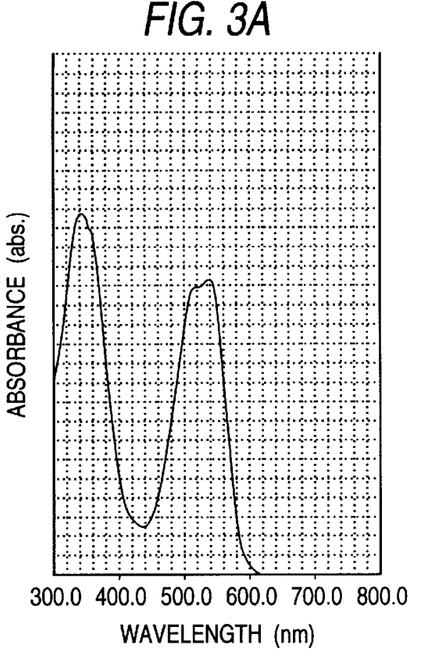
FIG. 3A, FIG. 3B, FIG. 3C and FIG. 3D are graphs of the visible-light absorbance spectra of magenta inks for ink-jet recording of Comparative Example 1, Comparative Example 2, Comparative Example 3 and Comparative Example 4, respectively.
Figure 3B:
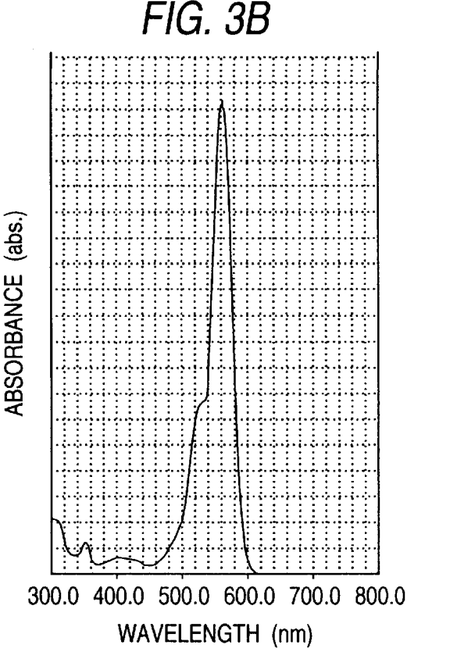
Figure 3C:
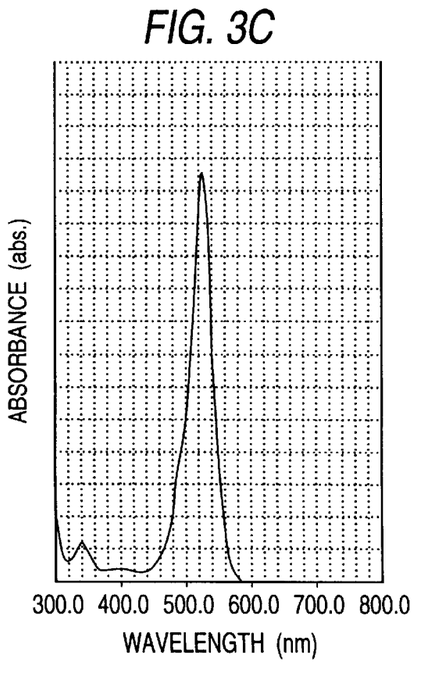
Figure 3D:
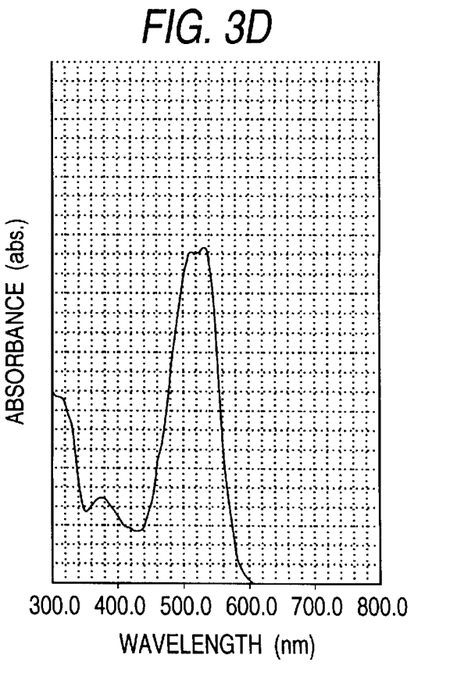

Absorbance:

Each ink of Examples 1 to 8 and Comparative Examples 1 to 6 is diluted 1000-fold with pure water. The 1/1000 dilution of each ink is put into a quartz cell having a thickness of 10 mm, and its spectral absorbance is measured with a self-spectrometer (UV-2500PC, from Shimadzu Seisakusho). The visible-light spectral patterns of the inks of Examples 1 to 3 are in FIGS. 1A, 1B and 1C, respectively. The visible-light spectral patterns of the inks of Examples 5 to 7 are in FIGS. 2A, 2B and 2C, respectively. The visible-light spectral patterns of the inks of Comparative Examples 1 to 4 are in FIGS. 3A, 3B, 3C and 3D, respectively.

pH:

The pH of each ink is measured with a pH meter (from Horiba Seisakusho), at 20° C. and 50% RH.

Surface Tension:

The surface tension of each ink is measured with a surface tensiometer (from Kyowa Surface Chemistry Co.), at 20° C. and 50% RH.

Viscosity:

The viscosity of each ink is measured with a tensiometer (from Rheomat), at 20° C. and 50% RH.

Amount of Ink Drop:

Each ink (1/4 tons, 662×80) is jetted out five times through a laboratory ink-jetting head at 20° C. and 50% RH and at a frequency of 1.8 kHz, onto small pieces of an ink absorbent, and the weight of each ink-received absorbent piece is measured. From the data, obtained is the amount of one ink drop/pulse. Evaluation of Capabilities of Ink:

Light-fastness:

Using a laboratory ink-jet printer, each ink of Examples 1 to 8 and Comparative Examples 1 to 6 is printed on commercially-available glossy paper A for ink-jet printing (having a 75-degree mirror surface gloss of 82%, from Fuji Xerox), commercially-available glossy paper B for ink-jet printing (having a 75-degree mirror surface gloss of 64%, from Seiko Epson), FX-L paper (from Fuji Xerox) and commercially-available postal cards, thereby forming solid images thereon. Also using the laboratory ink-jet printer, each ink set of Examples 9 to 11 and Comparative Examples 7 to 9 is printed on commercially-available glossy paper A for ink-jet printing (having a 75-degree mirror surface gloss of 82%, from Fuji Xerox), commercially-available glossy paper B for ink-jet printing (having a 75-degree mirror surface gloss of 64%, from Seiko Epson), FX-L paper (from Fuji Xerox) and commercially-available postal cards, thereby forming thereon solid images of primary colors, cyan, magenta and yellow, and secondary colors, red (R), green (G) and blue (B). The image density of each printed sample is measured with a Macbeth densitometer. Then, the printed samples are exposed to light for 100 hours, using a light-fastness tester (XF-180, from Shimadzu Seisakusho), and the image density of each exposed sample is measured with the same densitometer. From the data, obtained is the color difference before and after the exposure test ($\Delta E^*ab = \{(\Delta L^*)^2 + (\Delta a^*)^2 + (\Delta b^*)^2\}^{1/2}$)

The light-fastness of the printed images is evaluated, based on the following criteria.

A: $\Delta E^*$ is not larger than 25.

B: $\Delta E^*$ is larger than 25 but not larger than 40.

C: $\Delta E^*$ is larger than 40.

Saturation (chroma):

Using the laboratory ink-jet printer, each ink of Examples 1 to 8 and Comparative Examples 1 to 6 is printed on commercially-available glossy paper A for ink-jet printing (having a 75-degree mirror surface gloss of 82%, from Fuji Xerox), commercially-available glossy paper B for ink-jet printing (having a 75-degree mirror surface gloss of 64%, from Seiko Epson), FX-L paper (from Fuji Xerox) and commercially-available postal cards, thereby forming solid images thereon. Also using the laboratory ink-jet printer, each ink set of Examples 9 to 11 and Comparative Examples 7 to 9 is printed on commercially-available glossy paper A for ink-jet printing (having a 75-degree mirror surface gloss of 82%, from Fuji Xerox), commercially-available glossy paper B for ink-jet printing (having a 75-degree mirror surface gloss of 64%, from Seiko Epson), FX-L paper (from Fuji Xerox) and commercially-available postal cards, thereby forming thereon solid images of primary colors, cyan, magenta and yellow, and secondary colors, red (R), green (G) and blue (B). The printed images are macroscopically compared with each other to sensually evaluate their color saturation.

The samples are evaluated for their color saturation, based on the following criteria:

A: The color solid image is almost clear.

B: The color solid image is somewhat dull.

C: The color solid image is extremely dull.

In addition, the magenta-related secondary colors, red and blue are evaluated, based on the following criteria.

Red:

A: The image is vivid red.

B: The image is somewhat orangish.

C: The image is orangish.

Blue:

A: The image is vivid blue.

B: The image is somewhat dull blue.

C: The image is dull blue.

Jettability through nozzle:

The inks of Examples 1 to 8 and Comparative Examples 1 to 6 are left in the open air at 20° C. and 50% RH for a predetermined period of time. Using the laboratory ink-jet printer (resolution: 800 dpi), each ink having been thus exposed to air is tested for its jettability through the nozzle of the printer. The jettability of the inks is evaluated, based on the following criteria:

A: After left for 300 seconds, the ink is jettable.

B: After left for 180 seconds, the ink is jettable.

C: After left for 180 seconds, the ink is not jettable. White streaks in printed images (for evaluating the responsibility of ink to printing frequency):

Using the laboratory ink-jet printer, each ink of Examples 1 to 8 and Comparative Examples 1 to 6 is printed on FX-L paper (from Fuji Xerox) to form solid images thereon. The printed images are macroscopically checked for white streaks.

The printed images are evaluated, based on the following criteria:

A: The solid image is uniform, with no white streaks therein.

B: The solid image has some white streaks therein.

C: The solid image has large white streaks therein. Bleed:

Using the laboratory ink-jet printer, each ink set of Examples 9 to 11 and Comparative Examples 7 to 9 is printed on commercially-available glossy paper A for ink-jet printing (having a 75-degree mirror surface gloss of 82%, from Fuji Xerox), commercially-available glossy paper B for ink-jet printing (having a 75-degree mirror surface gloss of 64%, from Seiko Epson), FX-L paper (from Fuji Xerox) and commercially-available postal cards, thereby forming thereon solid images of secondary colors, red (R), green (G) and blue (B). The printed images are macroscopically compared with each other to sensually evaluate their bleed. The image bleed, if any, is caused by color mixing.

The samples are evaluated for their bleed resistance, based on the following criteria:

A: The solid image has no color bleed.
B: The solid image has some color bleed.
C: The solid image has much color bleed.

TABLE 1

| | Absorbance (abs.) | | | pH | Surface Tension (mN/m) | Viscosity (mPas) | Amount of One Ink Drop (ng) |
|---|---|---|---|---|---|---|---|
| | A | B | A/B | | | | |
| Example 1 | 1.410: 520 nm | 0.780: 315 nm | 1.81 | 7.1 | 35 | 1.9 | 15 |
| Example 2 | 1.130: 520 nm | 0.620: 315 nm | 1.82 | 7.9 | 37 | 2.1 | 14 |
| Example 3 | 1.020: 520 nm | 0.565: 315 nm | 1.81 | 7.8 | 39 | 2.0 | 15 |
| Example 4 | 0.680: 520 nm | 0.375: 315 nm | 1.81 | 7.5 | 36 | 2.0 | 15 |
| Example 5 | 0.600: 513 nm | 0.550: 311 nm | 1.09 | 8.2 | 35 | 2.2 | 14 |
| Example 6 | 0.507: 513 nm | 0.465: 311 nm | 1.09 | 7.5 | 36 | 2.1 | 15 |
| Example 7 | 0.461: 513 nm | 0.424: 311 nm | 1.09 | 7.6 | 38 | 2.2 | 14 |
| Example 8 | 0.346: 513 nm | 0.316: 311 nm | 1.09 | 7.0 | 36 | 2.2 | 14 |
| Comp. Ex. 1 | 0.765: 541 nm | 0.940: 344 nm | 0.81 | 7.0 | 36 | 2.7 | 13 |
| Comp. Ex. 2 | 2.260: 565 nm | 0.149: 353 nm | 15.17 | 7.8 | 39 | 2.8 | 13 |
| Comp. Ex. 3 | 2.505: 526 nm | 0.235: 342 nm | 10.7 | 7.6 | 39 | 1.4 | 22 |
| Comp. Ex. 4 | 0.866: 533 nm | 0.858: 513 nm | 1.01 | 7.9 | 37 | 3.2 | 12 |
| Comp. Ex. 5 | 0.956: 541 nm | 1.175: 344 nm | 0.81 | 7.7 | 38 | 2.6 | 13 |
| Comp. Ex. 6 | 2.836: 565 nm | 0.187: 353 nm | 15.18 | 7.0 | 34 | 1.9 | 21 |

TABLE 2

| | Light-fastness (ΔE*) | | | | Saturation | | | | Frequency Responsibility | Jettability through nozzle |
|---|---|---|---|---|---|---|---|---|---|---|
| | glossy paper A | glossy paper B | FX-L paper | postal card | glossy paper A | glossy paper B | FX-L paper | postal card | | |
| Example 1 | A | A | A | A | A | A | A | A | A | A |
| Example 2 | A | A | A | A | A | A | A | A | A | A |
| Example 3 | A | A | A | A | A | A | A | A | A | A |
| Example 4 | A | A | A | A | A | A | A | A | A | A |
| Example 5 | A | B | A | A | A | A | A | A | A | B |
| Example 6 | A | B | A | A | A | A | A | A | A | A |
| Example 7 | A | B | A | A | A | A | A | A | A | A |
| Example 8 | A | B | A | A | A | A | A | A | A | A |
| Com. Ex. 1 | C | C | B | B | B | B | B | B | B | C |
| Com. Ex. 2 | C | C | A | A | B | B | B | B | C | C |
| Com. Ex. 3 | C | C | C | C | A | A | A | A | B | C |
| Com. Ex. 4 | C | C | A | A | A | A | A | B | C | C |
| Com. Ex. 5 | C | C | B | B | B | B | C | C | B | B |
| Com. Ex. 6 | C | C | B | B | B | B | B | B | A | B |

TABLE 3

| | | Light-fastness (ΔE*) | | | | Image Quality | | | | | | |
|---|---|---|---|---|---|---|---|---|---|---|---|---|
| | | | | | | Saturation | | | | Bleed | | | |
| | | glossy paper A | glossy paper B | FX-L paper | postal card | glossy paper A | glossy paper B | FX-L paper | postal card | glossy paper A | glossy paper B | FX-L paper | postal card |
| Ex. 9 | | | | | | | | | | | | | |
| | C | A | A | A | A | A | A | A | A | | | | |
| | M | A | A | A | A | A | A | A | A | | | | |
| | Y | A | A | A | A | A | A | A | A | | | | |
| | R | A | A | A | A | A | A | A | A | A | A | A | A |
| | G | A | A | A | A | A | A | A | A | A | A | A | A |
| | B | A | A | A | A | A | A | A | A | A | A | A | A |

TABLE 3-continued

| | Image Quality | | | | | | | | | | | |
|---|---|---|---|---|---|---|---|---|---|---|---|---|
| | Light-fastness (ΔE*) | | | | Saturation | | | | Bleed | | | |
| | glossy paper A | glossy paper B | FX-L paper | postal card | glossy paper A | glossy paper B | FX-L paper | postal card | glossy paper A | glossy paper B | FX-L paper | postal card |
| Ex. 10 | | | | | | | | | | | | |
| C | A | A | A | A | A | A | A | A | | | | |
| M | A | A | A | A | A | A | A | A | | | | |
| Y | A | A | A | A | A | A | A | A | | | | |
| R | A | A | A | A | A | A | A | A | A | A | A | A |
| G | A | A | A | A | A | A | A | A | A | A | A | A |
| B | A | A | A | A | A | A | A | A | A | A | A | A |
| Ex. 11 | | | | | | | | | | | | |
| C | A | A | A | A | A | A | A | A | | | | |
| M | A | B | A | A | A | A | A | A | | | | |
| Y | A | A | A | A | A | A | A | A | | | | |
| R | A | B | A | A | A | A | A | A | A | A | A | A |
| G | A | A | A | A | A | A | A | A | A | A | A | A |
| B | A | B | A | A | A | A | A | A | A | A | A | A |
| Comp. Ex. 7 | | | | | | | | | | | | |
| C | A | A | A | A | A | A | A | A | | | | |
| M | C | C | B | B | B | B | B | B | | | | |
| Y | A | A | A | A | A | A | A | A | | | | |
| R | C | C | B | C | B | B | C | C | A | A | B | B |
| G | A | A | A | A | A | A | A | A | A | A | A | A |
| B | C | C | B | B | B | B | C | C | A | A | B | B |
| Comp. Ex. 8 | | | | | | | | | | | | |
| C | A | A | A | A | A | A | A | A | | | | |
| M | C | C | A | A | B | B | B | B | | | | |
| Y | A | A | A | A | A | A | A | A | | | | |
| R | C | C | A | A | B | B | B | B | B | B | C | C |
| B | A | A | A | A | A | A | A | A | A | A | A | A |
| G | C | C | A | A | B | B | B | B | B | B | C | C |
| Comp. Ex. 9 | | | | | | | | | | | | |
| C | A | A | A | A | A | A | A | A | | | | |
| M | C | C | B | B | B | B | C | C | | | | |
| Y | A | A | A | A | A | A | A | A | | | | |
| R | C | C | B | B | B | B | B | B | A | A | A | A |
| G | A | A | A | A | A | A | A | A | A | A | A | A |
| B | C | C | B | B | B | B | B | B | A | A | A | A |

From the data in Tables 1 to 3, it is understood that the magenta inks of Examples 1 to 8 and the color ink sets of Examples 9 to 11 all have good light-fastness, good color reproducibility, good color-mixing bleed resistance and good frequency responsibility, all well jettable through nozzles without clogging them. As opposed to these, the magenta inks overstepping the range of the invention with respect to the ratio A/B (Comparative Examples 1, 2, 3, 5, 6) and those overstepping the range of the invention with respect to the wavelength for the second peak B in their absorbance profile (Comparative Examples 2, 4, 6), and also the color ink sets containing any of them (Comparative Examples 7 to 9) are all inferior to the inks and the ink sets of the invention as above with respect to their printing capabilities.

As described in detail hereinabove with reference to its preferred embodiments, the present invention provides excellent magenta ink for ink-jet recording. Specifically, the magenta ink of the invention satisfies all the necessary properties including good light-fastness, good color reproducibility, especially good color reproducibility of magenta-related secondary colors of red and blue, and high reliability, and gives satisfactory high-quality images. The invention also provides a color ink set for ink-jet recording, which contains the magenta ink; and an ink-jet recording method in which is used the magenta ink or the color ink set.

While the invention has been described in detail and with reference to specific embodiments thereof, it will be apparent to one skilled in the art that various changes and modifications can be made therein without departing from the spirit and scope thereof.

What is claimed is:

1. An ink-jet recording method, comprising jetting an ink drop out through a nozzle onto an ink-jet recording sheet, wherein the ink drop is approximately between 1 and 20 ng and is comprised of a magenta ink, wherein the magenta ink comprises water, a colorant and at least two kinds of water-soluble organic solvents, further wherein the magenta ink has a visible-light absorbance spectrum with a first peak A (abs.) in the range between 500 and 570 nm, and a second peak B (abs.) in the range between 300 and 350 nm, and having a ratio A/B of 0.9 to 2.5, and the ink-jet recording sheet having at least approximately 40% of a 75-degree mirror surface gloss defined in JIS-Z-8741.

2. The ink-jet recording method according to claim 1, wherein the ink is jetted out utilizing thermal energy.

3. An ink-jet recording method according to claim 1, wherein the at least two water soluble-organic solvents are at least two solvents selected from the group consisting of polyalcohols, polyalkylene glycols, glycol ethers and polar solvents.

4. An ink-jet recording method according to claim 1, wherein the at least two water-soluble organic solvents comprise from 3% to 40% by weight of the magenta ink.

5. An ink-jet recording method according to claim 1, wherein the colorant is an anionic water-soluble organic dye and comprises from 0.1 to 10.0% by weight of the magenta ink.

6. An ink-jet recording method according to claim 1, further comprising (i) at least one surfactant selected from the group consisting of nonionic, anionic and ampholytic surfactants in an amount of approximately from 0.005 to 5% by weight of the magenta ink, (ii) a nitrogen-containing compound having a pKa at 20° C. of from 6.0 to 10.0, and (iii) an alkali metal hydroxide.

7. An ink-jet recording method according to claim 1, wherein the pH of the magenta ink is approximately between 5.0 and 12.0, the surface tension, $\gamma$, of the ink is approximately between 20 and 45 mN/m, and the viscosity, $\eta$, of the ink is approximately between 1.5 and 5.0 mPas.

8. An ink-jet recording method according to claim 1, comprising jetting ink drops of cyan ink and yellow ink for ink-jet recording, each of which comprising a water, a colorant, and at least two water-soluble organic solvents.

9. An ink-jet recording method according to claim 8, wherein the cyan ink and the magenta ink both have at least two colorant density levels.

10. An ink-jet recording method according to claim 8, wherein the colorant for the cyan ink is at least one colorant selected from C.I. Direct Blue 86, C.I. Diect Blue 199, C.I. Direct Blue 307 and C.I. Acid Blue 9, and the colorant for the yellow ink is at least one colorant selected from C.I. Direct Yellow 86, C.I. Direct Yellow 132, C.I. Direct Yellow 142, C.I. Direct-Yellow 144, and C.I. Direct Yellow 173.

* * * * *